April 23, 1935.  J. BIJUR  1,998,439
LUBRICATION
Filed April 15, 1931  8 Sheets-Sheet 1
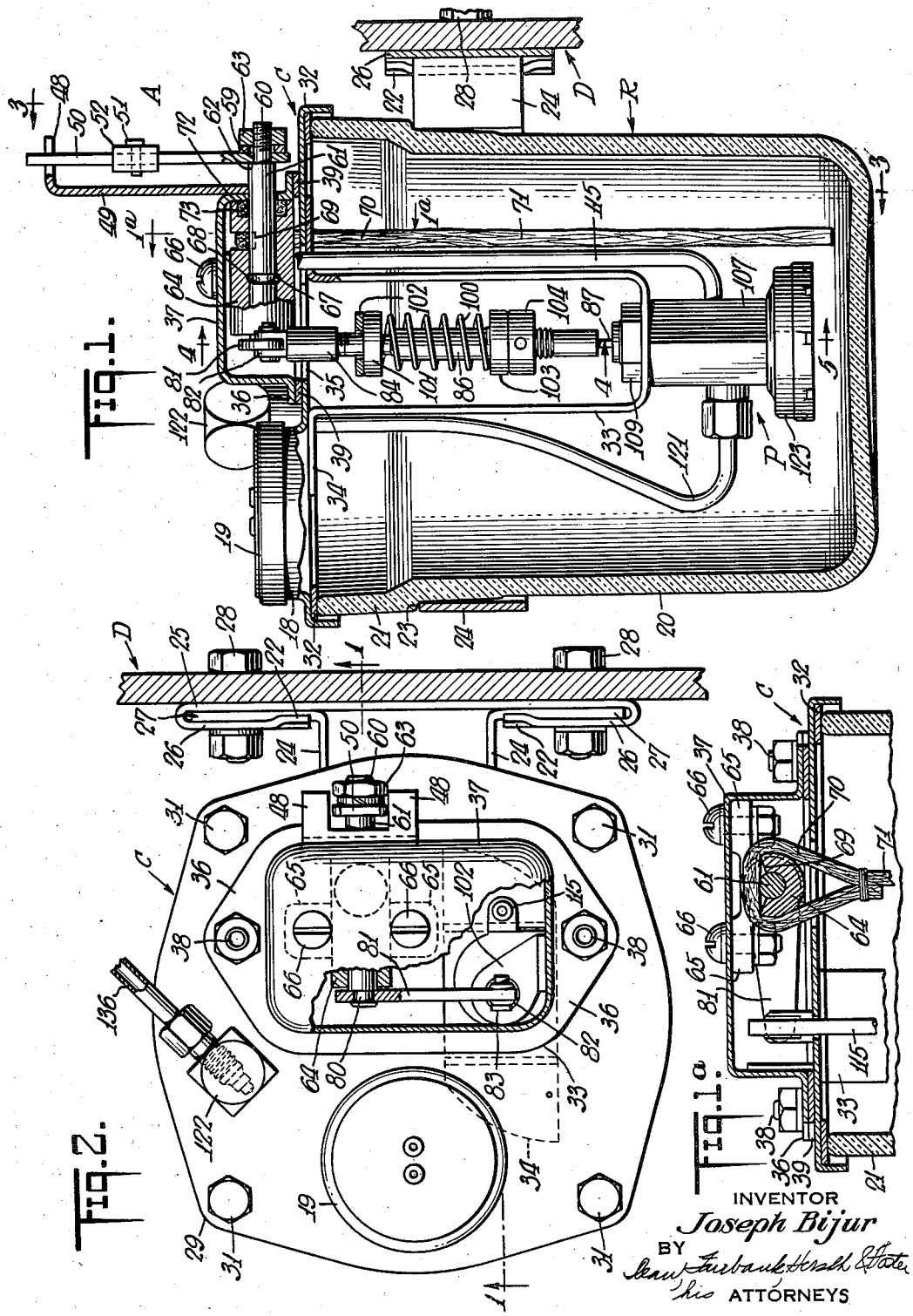
INVENTOR
Joseph Bijur
BY
his ATTORNEYS

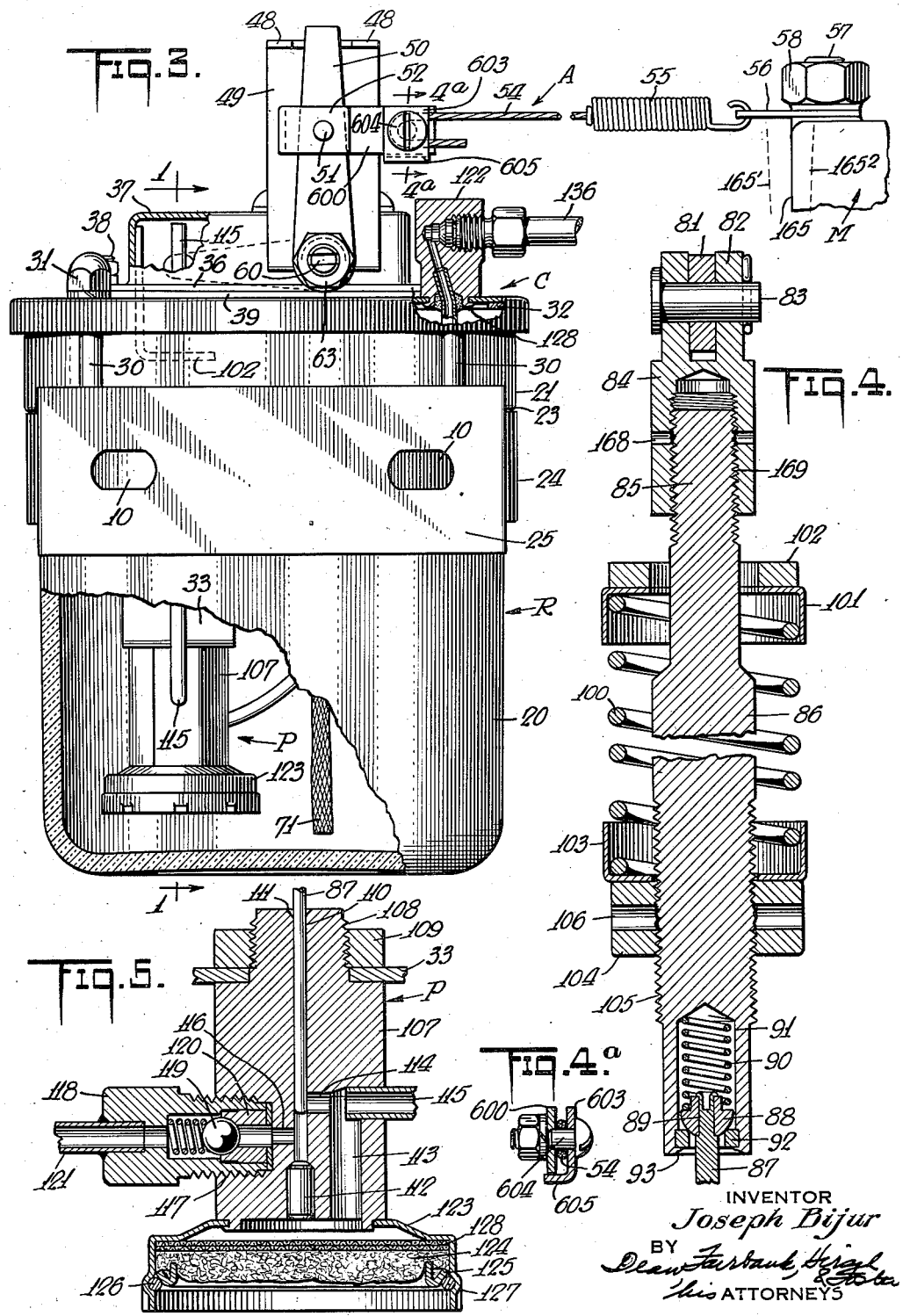

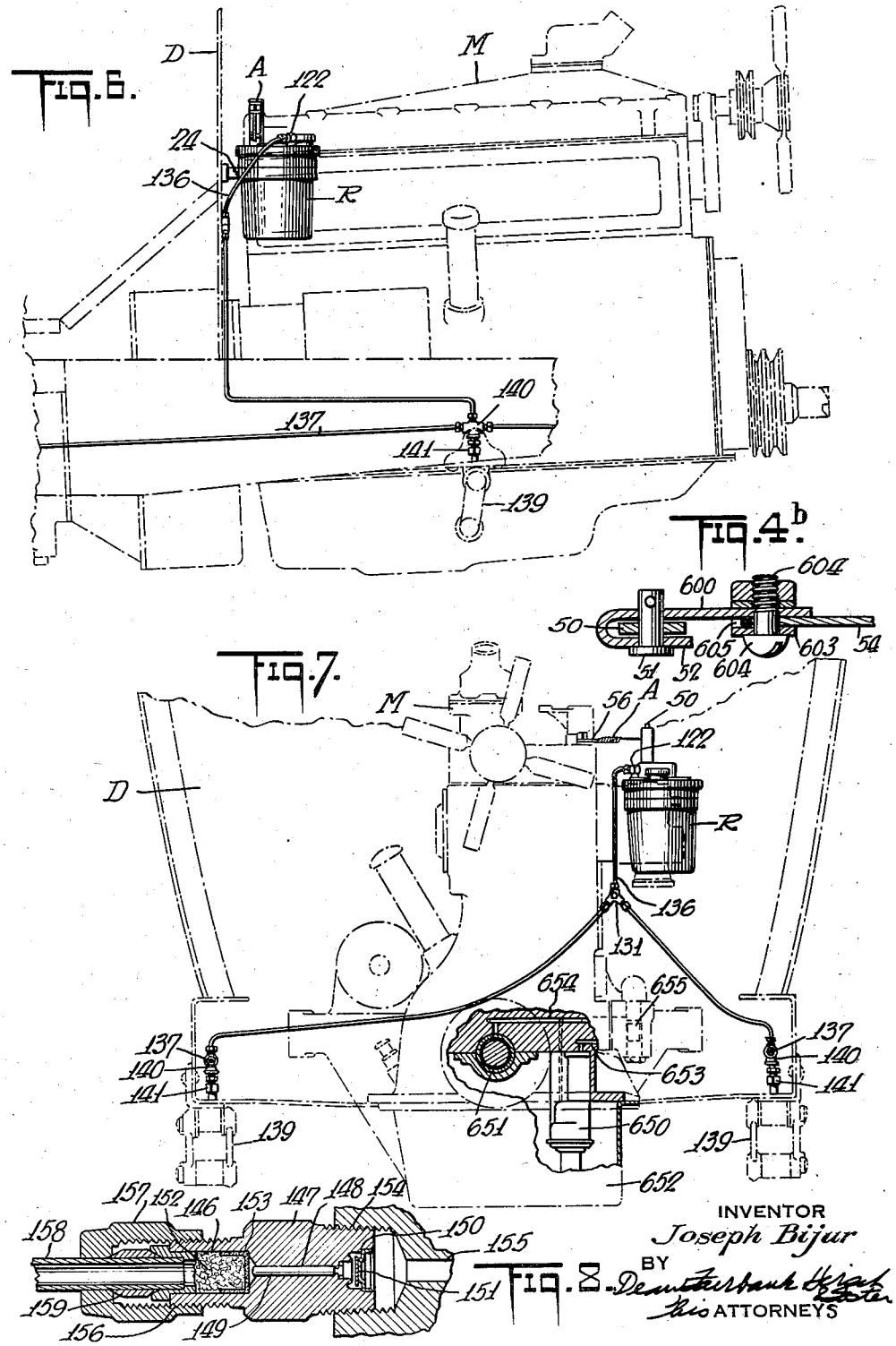

April 23, 1935.  J. BIJUR  1,998,439

LUBRICATION

Filed April 15, 1931  8 Sheets-Sheet 4

INVENTOR
Joseph Bijur
BY
*his* ATTORNEYS

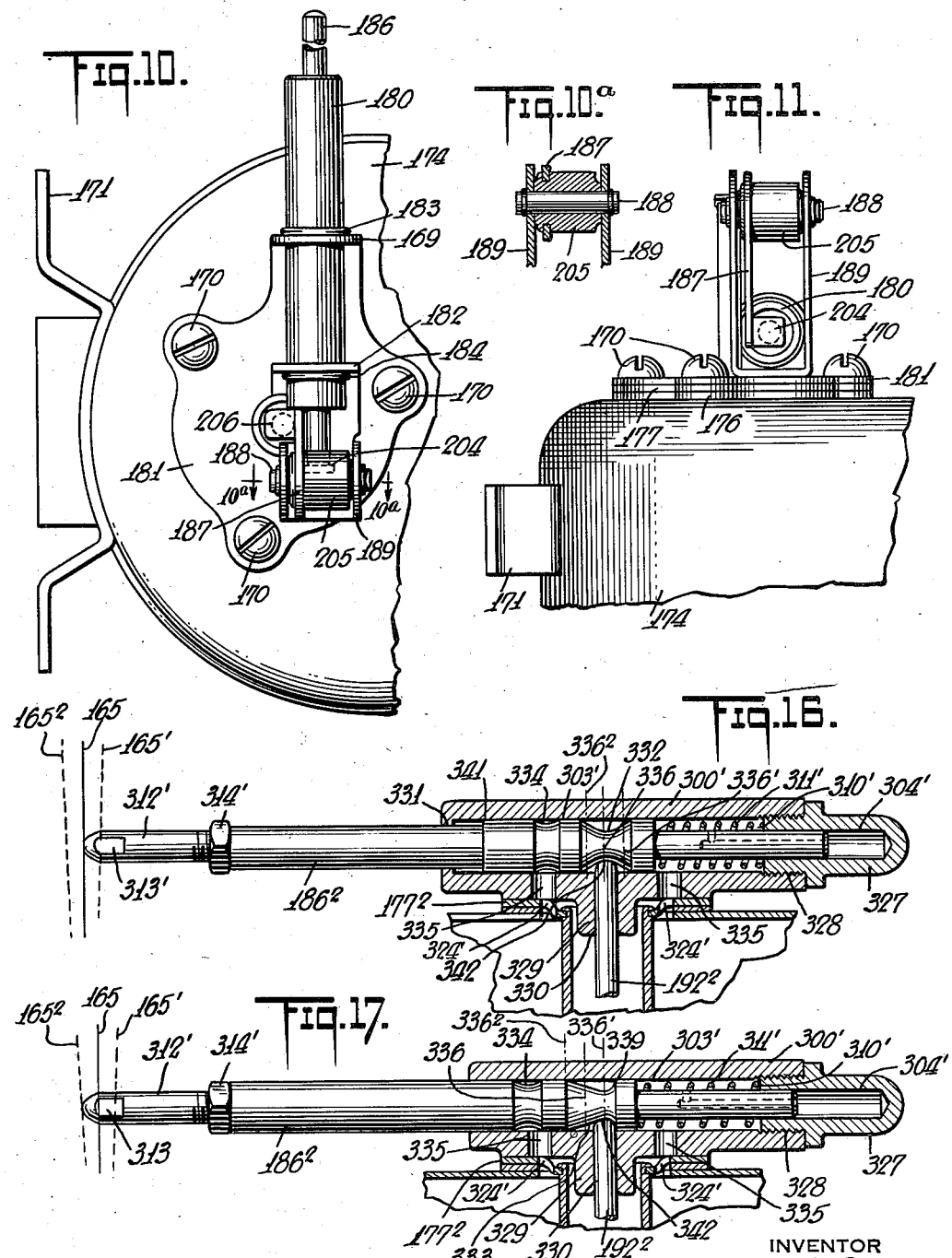

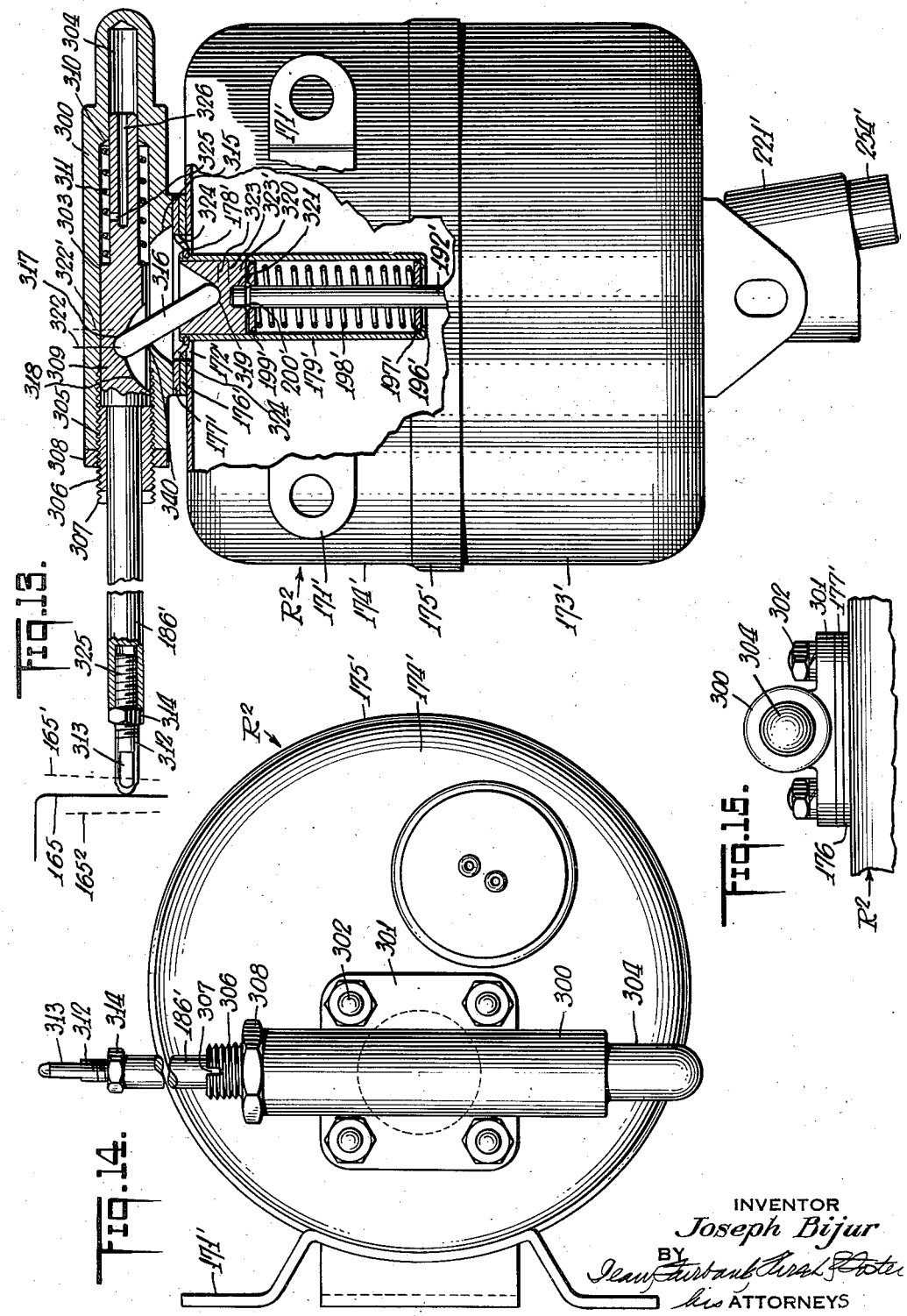

April 23, 1935.    J. BIJUR    1,998,439
LUBRICATION
Filed April 15, 1931    8 Sheets-Sheet 7
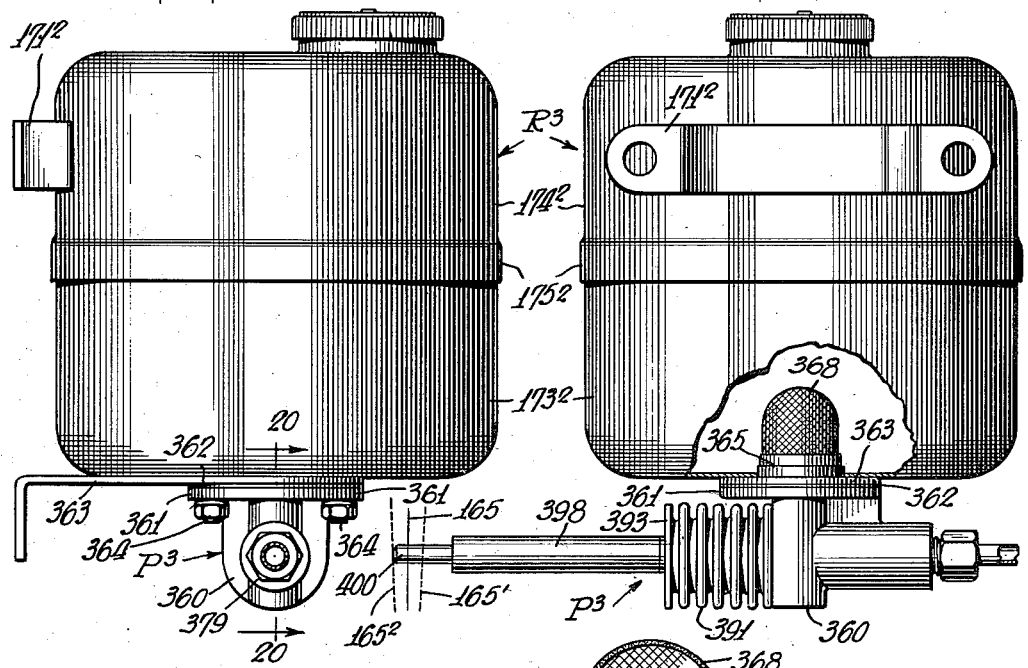
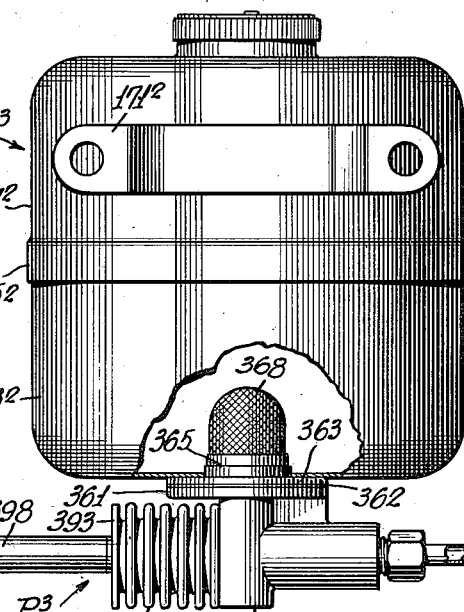
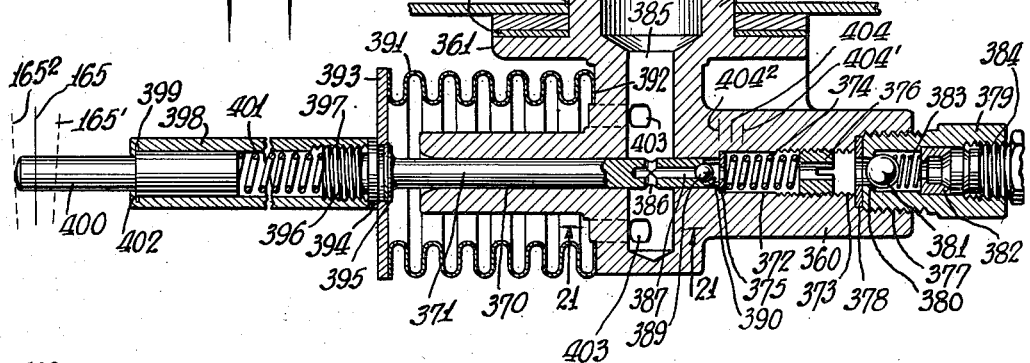
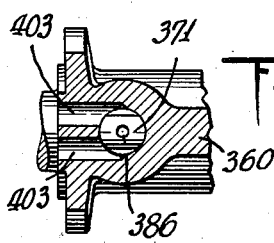
INVENTOR
Joseph Bijur
BY
his ATTORNEYS April 23, 1935.  J. BIJUR  1,998,439
LUBRICATION
Filed April 15, 1931  8 Sheets-Sheet 8
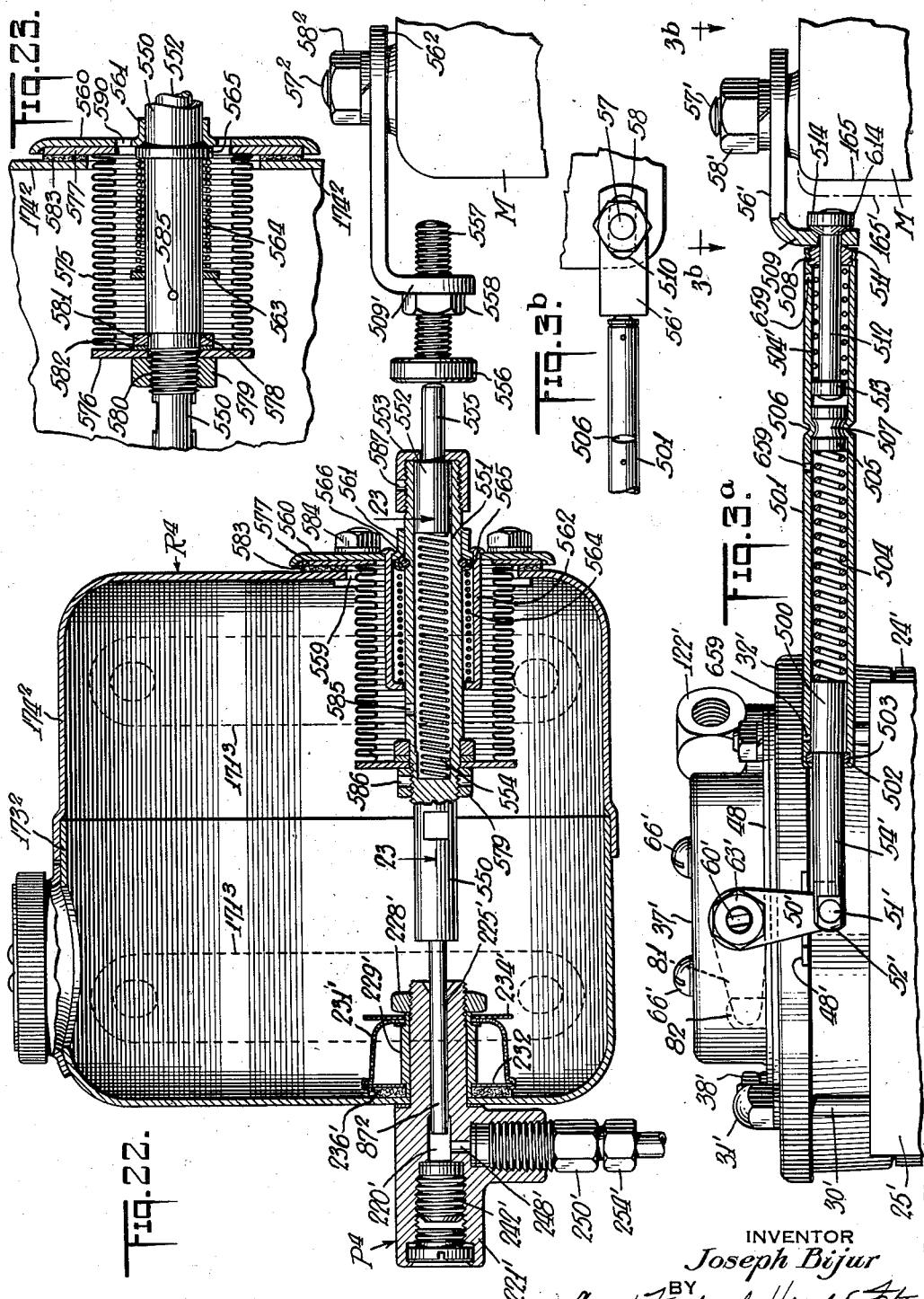
INVENTOR
Joseph Bijur
BY
his ATTORNEYS Patented Apr. 23, 1935

1,998,439

UNITED STATES PATENT OFFICE 1,998,439

LUBRICATION

Joseph Bijur, New York, N. Y., assignor to Auto Research Corporation, a corporation of Delaware Application April 15, 1931, Serial No. 530,166

31 Claims. (Cl. 184—7)

My present invention relates to liquid distribution systems and primarily to central chassis lubrication systems applicable to automobiles and other vehicles and, while not limited thereto, is concerned more especially with systems of the drip plug type, generally claimed and disclosed in the prior Patents Nos. 1,632,771, 1,732,212 and 1,746,139.

It is an object of the invention to effect lubricant propulsion to the chassis bearings, by power already available on the vehicle and to meter the lubricant for substantially correct feed under favorable, as well as under adverse conditions of operation, all with the use of simple, compact and rugged mechanism.

Another object is to effect the propulsion of lubricant to the bearings without the need for manual actuation or control, and in accordance with the requirements of each bearing throughout the operation of the vehicle, all without resort to complicated reduction gearing, pulley arrangements or other mechanical operating or wearing connection with the running mechanism of the vehicle.

Another object is to provide a compact lubricant propulsion or pumping installation of the character described which is particularly adapted to trucks, busses and to other heavy vehicles, the bearings of which require relatively large amounts of lubricant as compared to pleasure cars, which shall have sufficient power automatically derived during the running of the vehicle to supply such amounts of lubricant without the necessity of using excessively large parts, auxiliary motors or complicated power increasing devices.

Another object is to provide a lubricant propulsion or pumping installation of the character described which may be readily applied to a motor vehicle, without restriction to specific locations, and which may be directly actuated by short, substantially unexposed, inobtrusive mechanical connections from an already existant portion of the vehicle without the need for intervening motor arrangements and without substantially changing or modifying the vehicle structure.

Another object is to derive the required energy for the operation of an accessory associated with the mechanism from a non-driven part of the mechanism, which part inherently moves as a mere incident to operation of the mechanism and in such movement evolves energy far in excess of that required for the operation of the accessory.

Another object is to derive the required energy to supply lubricant under pressure to a central lubricating installation for an automotive vehicle from the vibration or oscillation of a non-driven part of the vehicle, which oscillation or vibration is incidentally caused by operation of the vehicle and is not substantially damped by the vehicular springs or shock absorbers, said non-driven part being preferably of substantial mass so as to evolve an amount of energy far in excess of that required for operation of the lubricant pressure supply.

Another object is to provide improved pumping arrangements which are adapted to utilize a horizontal or sidewise reciprocating mechanical energy source to actuate a pump, for example of the reciprocating plunger type, said arrangement being provided with simple, inexpensive and reliable arrangements for conveniently transforming said reciprocating energy into a pump movement of the desired magnitude.

Other objects are in part obvious and will be in part pointed out hereinafter.

A feature of the present invention resides in the utilization of slight relative movements of different structural parts of a mechanism, preferably resulting incidentally and not directly from the operation of the mechanism, to furnish the motive power for an accessory associated with said mechanism, such accessory being for example in a preferred embodiment the lubricant pressure source associated with a central lubricating installation. In the case of a motor vehicle, to which the present invention is particularly directed, relative movement between two chassis structures resulting from weaving of the chassis, or an oscillation or vibration of the heavy engine body resulting from said weaving of the chassis and/or from the flexibility of the engine supports may be used to actuate a lubricant pump supplying a central lubricating installation, the ejecting element of the pump moving with one of said vehicle elements, and the body of the pump moving with the other.

In one embodiment the pumping mechanism is preferably enclosed within or positioned at or below the bottom of a lubricant reservoir, and is conveniently attached to the dashboard. The pumping mechanism may be directly connected to the automotive engine body, preferably adjacent the top thereof, by push rods or pull cords in such a manner that the oscillation or vibration of said engine body or desirably the component thereof transverse to the engine, will cause a reciprocation of the piston or plunger of said pump.

The ejecting element of the pump may be caused to reciprocate vertically or horizontally, the former arrangement necessitating suitable means for converting the horizontal vibration of the engine body into a vertical stroke of the ejecting element and the latter enabling direct connection between the engine body and the ejecting element. The connections between the motor body and the pump plunger may be such as to cause the pump to reciprocate once for each reciprocation of the motor, or to reciprocate a lesser or a greater number of times than the motor body, in one arrangement the pump passing through two reciprocation cycles for each reciprocation cycle of the engine.

In converting horizontal or sideward movements of the engine into vertical reciprocating movements of the pump, bell crank levers, cam arrangements or toggle linkages may be utilized. These are most conveniently positioned at the top of the reservoir and lubricated from this reservoir, as by means of wicks or splash, or the need for lubricant may be eliminated by employing frictionless bearings. Where the ejecting element of the pump is arranged so as to reciprocate horizontally, the pump structure may be conveniently positioned in the bottom of the reservoir or therebelow together with its actuating connections, with the result that all parts thereof will be thoroughly lubricated. In this arrangement a sylphon is desirably provided to prevent leakage at the junction of the actuating connection and the pump.

The arrangements above described may be so constructed as to give any desired sensitivity and preferably to give rise to such sensitivity that the pumping mechanism will always take full strokes, substantially regardless of the amplitude of the engine body vibration, the output of the pump being preferably dependent upon the frequency of said vibration. In accomplishing this result it is desirable to use but a fraction of the engine movement for the actuation of the pump, said fraction preferably including a short movement on either side of the normal quiescent body position or a movement on only one side of said quiescent position. In such cases provisions may be made to permit of relative movement between the engine body and the pump element moving relatively thereto, said provision including slacking pull cords, compressible or extensible resilient members and/or connections or constructions permitting separation between the engine body and the actuating connection adapted to contact therewith.

The ejecting element may be pushed or pulled by the motor during either the charging or discharging stroke, and it is preferably associated with a resilient means, such as a spring, which stores up sufficient energy during the pushing or pulling of the ejecting elements by the engine to cause it to make a return stroke during reverse movement of said engine. These springs or resilient means in addition to causing return strokes of the pump ejecting element may also serve, preferably in association with other springs, to take up any slack and prevent rattling, or in cases where the pump is actuated by pushing to cause contact element of the actuating connections to follow closely the movement of the engine body.

In the accompanying drawings in which are shown one or more of the various possible embodiments of the several features of the invention:

Figs. 1 to 5 represent one embodiment of a combined lubricant reservoir and pump where the piston reciprocates vertically, is pulled by the engine body in its charging stroke and is discharged under the force of a spring stressed during said stroke; Fig. 1 being a side sectional view upon the line 1—1 of Fig. 2; Fig. 1a being an enlarged fragmentary side sectional view upon the line 1a—1a of Fig. 1; Fig. 2 being a top view in partial section; Fig. 3 being a side view in partial section upon the line 3—3 of Fig. 1, Figs. 4 and 5 being respectively, enlarged side sectional views upon the lines 4—4 and 5—5 of Fig. 1, and Figs. 4a and 4b being respectively, longitudinal and transverse sectional views of the attachment of the actuating connection of Fig. 3; Figs. 3a and 3b illustrate another modification in which the piston is pushed by the engine body in its charging stroke, Fig. 3a being a fragmentary side view in partial section of the actuating connections and Fig. 3b being a top view upon the line 3b—3b of Fig. 3a;

Figs. 6 and 7 show the positioning of the reservoir and pump combination of Figs. 1 to 5 upon the dashboard of an automotive vehicle together with a fragmentary portion of a distributing system, Fig. 6 being a side view and Fig. 7 being a front view in partial section of the engine with the hood, the wheels and part of the chassis removed;

Fig. 8 illustrates in longitudinal section a typical flow metering device which may be utilized in connection with the distributing conduit system;

Figs. 9 to 12 illustrate another embodiment in which the vertical discharge stroke of the pump is caused by the pushing action of the motor and the return charge stroke takes place under the influence of a stressed spring, Fig. 9 being a side view in partial section, Figs. 10 and 11 being fragmentary top and end views respectively, of the actuating connections, Fig. 10a being a fragmentary side sectional view upon an enlarged scale along the line 10a—10a of Fig. 10, and Fig. 12 being an enlarged side sectional view of the pumping mechanism upon the line 12—12 of Fig. 9;

Figs. 13 to 15 illustrate another embodiment which operates similarly to the embodiment of Figs. 9 to 12, Fig. 13 being a side view in partial section, and Figs. 14 and 15 being respectively, top and end views of the actuating connections;

Figs. 16 and 17 are fragmentary longitudinal sectional views showing alternative actuating connections which may be used in lieu of that of Figs. 13 to 15;

Figs. 18 to 21 illustrate another embodiment in which the pump mechanism is positioned below the reservoir and is provided with a horizontally reciprocating plunger directly pushed by the swaying motor during the charging stroke and returned by a stressed spring, Figs. 18 and 19 being side views at right angles to each other, the latter in partial section and Figs. 20 and 21 being enlarged side and transverse fragmentary sectional views upon the lines 20—20 of Fig. 18 and 13—13 of Fig. 20 respectively; and Figs. 22 and 23 illustrate another embodiment which functions similarly to the embodiment of Figs. 18 to 21, but in which the actuating connections for the pump pass directly through the lower portion of the reservoir, Fig. 22 being a side sectional view and Fig. 23 being a fragmentary sectional view upon the line 23—23 of Fig. 22.

Figs. 1, 2 and 3 show a reservoir R and pump P combination together with the actuating connections A, the pump P being enclosed in the reservoir R adjacent the bottom thereof. The actuating connections A for transmitting the pulling movement of the automotive engine body M into a vertical charging stroke of the pump are positioned above the reservoir and above the pump. The cap or cover C of tank or reservoir R supports both the pump and said actuating connections and is also provided with a filler neck 18 closed between filling operations by cap 19.

The reservoir R may consist of a glass bowl 20 with an expanded rim 21 to afford a shoulder 23 for resting upon the carrying strap 24. The strap 24 cooperates with an associated bracket 25, the ends 26 of which notched at 22, overlap the outturned ends 27 of the strap 24. The bolts 28 passing through the coincident openings 10 in the ends 26 and 27 serve to attach the device to the dashboard D or to any other suitable support.

To the outside of strap 24 are attached the upstanding bolts 30, which project upwardly through spaced openings near the vertices 29 of the squared cover C. The nuts 31 are screwed upon the end of bolts 30 and press the cover C firmly upon the top of the glass tank 20. The interposed compressed gasket 32 assures a substantial lubricant-tight fitting.

A depending support strap 33 is secured at its ends 34, as by spot welding, to the underside of cover C to straddle an opening 35 therein. The flange 36 of the supplementary cover 37 is secured on top of the main cover C above the opening 35 by the screws 38. The gasket 39 forms a liquid-tight connection between auxiliary cover 37 and the main cover C. From the top of the supplementary cover 37 are supported the actuating connections consisting of a substantially vertical lever 50 to which is intermediately pivoted by the pin 51 a clevis 52 attached to a guy-wire or jiffy rope 54. The wire or rope 54 is connected to the sideswaying motor body M by means of a spring 55 hooked into an eyelet 56 rigidly attached to said motor body by a bolt 57 and a nut 58. The lower end of the lever 50 is provided with a flattened opening 59 which fits a correspondingly shaped and threaded reduced portion 60 at the end of the horizontal rod 61. The lever 50 is clamped against a shoulder 62 on said rod by the nut-washer combination 63. The fork 48 at the top of the upstanding plate 49 attached at its lower end to the side of the supplementary cover 37 limits the movement of the lever.

The rod 61 (see also Fig. 1a) bears within the piece 64 which piece is provided with ears 65 attached by the machine screws 66 to the underside of the cover 37; with a pin 67 cooperating with a groove 68 in the rod 61 to prevent lateral movement thereof; with a slot 69 to receive the loop 70 of a wick 71 depending into the bowl 20; and with a recess 72 to receive the gasket material 73 making a lubricant-tight connection between the block 64 and the interior side of the cover 37, thus preventing the escape of lubricant through the opening for the rod 61 thereof onto the cover C. The other end 80 of the rod 61 is similarly flattened to hold in position one end of the substantially horizontal lever 81. The other end of lever 81 is pivotally attached to the clevis 82 by the pin 83, said clevis constituting an upward extension of the screw cap 84.

The screw cap 84 extends through the opening 35 and is threaded upon the reduced portion 85 of the top of the connecting rod 86 (see also Fig. 4). The connecting rod 86 is connected to the pump plunger 87 by a universal joint comprising a hemispherical fitting 88 to which the upper reduced end 89 of the plunger 87 is riveted. A coil spring 90 in a socket 91 at the lower end of the rod 86 presses the spherical surface of the bowl member 88 against a collar 92, retained in place by the staking 93. This eliminates lost motion or rattling between the plunger 87 and the rod 86, permits a certain amount of flexibility and slight misalignments and prevents the creation of excess pressures by the pump, the spring 90 tending to collapse in the latter instance and permitting relative movement between the rod 86 and plunger 87.

The precompressed spring 100 encircling the rod 86 reacts at its upper end against the upper centering cup 101 rigidly connected to the bracket 102 in turn attached to the interior side of the cover 37 (see particularly Figs. 2 and 3). At its lower end it reacts against another centering cup 103 resting upon a nut 104 threaded upon the lower end of the rod 86 to give the proper degree of precompression of the spring 100. The nut 104 is locked in position upon the rod 86 by mutilating the thread 105 by a blow upon a pointed tool inserted through the hole 106 in said nut 104.

Depending from, and clamped upon, the lower end of the strap 33 (see Figs. 1 and 3 and particularly Fig. 5) is a cylinder block 107 which is provided with a reduced threaded portion 108 receiving the clamping nut 109; with a centrally bored cylinder to receive the plunger 87, the upper portion of which is provided with a conical depression 111 to admit of more ready insertion of said plunger and the lower portion of which is plugged at 112; with the vertical and lateral inlet bores 113 and 114 serving to admit lubricant to the pump cylinder, the outer portion of the lateral bore 114 receiving a vent pipe 115 which extends up to and terminates shortly below the cover 37; and with a lateral outlet bore 116 and socket 117, said latter receiving a hollow plug 118 which encloses the spring-seated outlet check valve 119 and the pressed-in seat therefor 120. The plug 118 also serves to receive the outlet pipe connection 121 which leads upwardly into, and is fixed within, the outlet junction 122 staked at 128 (see Fig. 3) to the cover C to which junction is connected the head of the distributing system 136 (see particularly Figs. 1, 2 and 3). To the lower outer edge of the block 107 is staked the upper rim of the downwardly facing cup 123. The cup 123 receives a felt filter 124 backed by screens 128 and held in position by means of the clamping ring 125 and the spring ring 126, said latter being snapped into the groove 127 of the cup.

In Figs. 6 and 7 is shown a desired positioning of the pump and reservoir R structure of Figs. 1 to 5 upon a dashboard D and its operating connection in respect to the engine structure M. The reservoir R is customarily located at such a height and is so spaced from the dashboard D by the bracket 24 as to enable the connecting wire or rope 54 to extend horizontally and transversely to the engine axis from the lever 50 to the eyelet 56. The conduit 136 from the outlet connections extends down along the dashboard and splits into two conduits at the junction 131, said conduits communicating with the mains 137 secured to the channel side members of the chassis frame. These mains feed the spring shackles 139 by means of the junctions 140 and the drip plugs or flow metering devices 141 as well as numerous other bearings not shown. In Fig. 7 is also shown in fragmentary section the engine oil pump 650 and a bearing structure 651 for the main crank shaft supplied with lubricant from said engine oil pump 650. The engine oil pump 650 receives its lubricant supply from the oil pan 652 and forces it through the bores 653 and 654 to said bearing structure, the relief valve 655 serving to prevent the generation of excessive pressures by said pump. The engine oil pump 650 is usually of the gear type and may be driven intermediately from the main shaft through the cam shaft.

The flow metering device may be conveniently of the restriction type and take the form of the embodiment shown in Fig. 8, in which the body 147 is centrally bored to form a passageway 148 receiving and almost completely filled by the pin 149. The length and diametral clearance of the annular passage thus formed determines the rating of the drip plug. The outlet side of the body is provided with a socket 150 which receives a valve 151, shown as being suction-seated, but which may also be spring-seated. The inlet side of the body 147 is also provided with a socket 146 adapted to receive the felt strainer 152 backed by the mesh 153. Both ends of the body are threaded, the outlet end 154 for attachment to a bearing structure 155 and the inlet end at 156 to enable capping of the drip plug by a junction 140 in run of the main 137 as at the spring shackles or for attachment to the coupling nut 157. The coupling nut 157 with its cooperating compression sleeve 159 enables connection of the piping 158 to said body at the ends of the mains 137.

In operation, the engine body M will vibrate ordinarily on either side of normal position 165 between the extreme positions, indicated by the lines 165' and 165² (see Fig. 3). The middle portion of this total movement (amounting to for instance about one-half thereof) is utilized to cause a reciprocation of the lever 50 between the limiting stops 48 and in turn reciprocation of the lever 81 and the piston 87, the motion of the engine being transferred through said levers preferably of equal effective length so that an engine movement, for example of $\frac{5}{16}$ inch will result in a piston stroke of about one-half that length between the top of the passageway 116 and the top of the passageway 114. The fork stop 48 will limit the maximum motion transmitted to the piston 87 to, for example, $\frac{5}{32}$ inch and excessive movement of the engine away from the reservoir will be taken up by the expansion of the spring 55 and toward the same by the slacking of the cord 54 and the spring 55. The head of lubricant in the reservoir R will force lubricant through the filter 124 into the passageway 113 and up into the vent pipe 115 until a level therein approximating that of the reservoir R is reached. The pump P, being of the ported variety, will permit the filling of the cylinder 110 between the top of the passageway 116 and the bottom of the passageway 114 when the piston 87 moves upwardly and will cause the expulsion of this volume of lubricant on the down stroke past the valve 119 into the outlet line 136. The wick 71 assures lubrication of the bearing of the rod 61 in the block 64.

In assembly, before the application of the outlet valve 119, the connecting rod 86 with the lever 50 in its extreme left position is screwed up or down within the cap 84 until the plunger 87 strikes a template or pin inserted through the outlet opening 116. This assures a proper lower limiting position of the piston, the permanency of this positioning being assured by mutilating the threads 169 on the reduced connecting rod extension 85 through the opening 168.

The embodiment shown in Figs. 3a and 3b employs substantially the same reservoir, pump, shaft and connecting rod arrangements as shown in Figs. 1 to 5 but the engine body in this embodiment pushes the actuating arrangements to elevate the piston and charge the pump, and moreover only movement of the engine body on one side of its normal quiescent position is utilized to actuate the pump. In this embodiment the lever 50' projects downwardly between the stops 48' attached to the lower edge of the cover 32'. The end of the lever is pivotally connected at 51' to the clevised end 52' of the push bar 54'. The enlarged end of said push bar 500 is enclosed in the sleeve 501, the end of which is turned over at 502 to embrace a washer 503, against which washer the bar 500 is pressed by means of the spring 504. The spring 504 reacts against the plug 505 which is retained in position by indenting the sleeve 501 at 506 into a groove 507 therein. The other end of the sleeve 501 is provided with the bored plug 508 which is adapted to contact with the downturned end 509 of the adjustable eyelet 56', the elongated opening 510 of which fits upon the bolt 57' and is clamped in position by the nut 58'. Through the opening 511 in the downturned end 509 and through the hollow plug 508 passes the rod 512, the ends of which are provided with the heads 513 and 514, the former one being embraced within the sleeve 501 and the latter being positioned inside of the downturned end 509. The spring 504' is contained within the right end of the sleeve 501 and is stressed between the head 513 and the plug 508. The openings 659 prevent air-compression in said sleeve 501 and also permit the introduction of lubricant if desirable.

In operation, the engine body movement 165—165' will move the sleeve 501 to the left moving the lever 50' from its right stop to its left stop 48'. This will elevate the plunger (not shown) and charge the pump. An excess movement of the engine body will result in collapse of the spring 504 and the relative movement between the sleeve 501 and the enlargement 500. A reverse movement of the engine body will first permit contact of the enlargement 500 with its stop 503 and of the lever 50' with its right stop 48', further movement resulting in a collapsing of the spring 504' and relative movement between the head 513 and the sleeve 501. Upon the next charging stroke the engine body will first take up the interval between the downturned end 509 and the plug 508 before actuating the pump.

In Figs. 9 to 12, is shown another embodiment in which the actuating connections are of such character that the engine body in its movement toward the reservoir will cause a discharge stroke and simultaneously stress a spring, which stressed spring will cause a return stroke upon the next movement of the engine away from the reservoir. In this embodiment the reservoir R' consists of a metallic cup-shaped base shell 173 and a cap cup shell 174 supporting the actuating connections A' and carrying an attachment bracket 171 for positioning on the dashboard. Attached to the top of the shell 174 and partly covering the opening 172 therein in a liquid-tight manner by means of the gasket 176, is a plate 177 provided with a depressed opening 178, around which is riveted the top of a depending cylinder 179. Superimposed upon and clamped with the plate 177 and the gasket 176 to the shell 174 by the screws 170 is a plate 181. This plate is provided with an upstanding flange 169 which cooperates with the upstanding flange 182 on the U-member 189 and the snap rings 183 and 184 to align and position the guide tube 180.

Extending through the tube 180 and bearing within the bushings 185 in the ends thereof, preferably of a material not requiring lubrication, is a push rod 186. The push rod 186 at its end away from the reservoir contacts with the engine head and at its end above the reservoir with the flange 204 of the long arm 190 of the bell crank lever 187. The lever 187 is riveted to a sleeve 205 which bears upon the pin 188 fixed in the U-bracket 189 (see also Fig. 10a).

The flange 206 of short arm 191 of the bell crank lever contacts with the top of the vertical connecting rod 192. The rod 192 passes downwardly through the tube 179 and through a concentric inner tube 193, riveted to and depending from a depressed portion 194 in the plate 181. The sleeve 193 contains a bearing bushing 195 of similar character to the bearing bushings 185. The lower portion of the depending tube 179 is turned inwardly at 196 to hold a washer 197 against which the lower end of the spring 198 reacts. The upper end of the spring reacts against a washer 199 which it presses against the snap ring 200 on the rod 192. At the upper limiting position of the connecting rod 192, the washer 199 will contact with and be stopped against the bottom of the inner sleeve 193. Attached by riveting to the lower reduced portion 201 of the rod 192 is a cup-shaped member 202 which embraces a socket connection of the same character as shown upon Fig. 4 similarly functioning parts being referred to by the same numerals primed.

The pump structure P' (see particularly Figs. 9 and 12) consists of a pump body 221 provided with a shoulder 222 adapted to contact in a lubricant-tight fashion with the bottom of the shell 173 by means of the gasket 223. The nipple 224 integral with said body extends upwardly within the reservoir and is centrally bored at 225 to receive the piston 87'. The lower portion of the bore 225 adjacent the lower end of the plunger 87' is enlarged to form a lubricant receiving and discharge chamber 226. Telescoped upon the nipple is a strainer combination, consisting of a sleeve 229 carrying an annular domed shaped metallic strainer 231 and a closing plate therefor 232. The outer rims of the strainer 231 and the plate 232 are held together by the channeled ring 233. The upper rim of the strainer is clamped or soldered between the annular plates 234 and 235, the upper plate 234 extending outwardly to protect the strainer from injury. The plates 232 and 235, by cooperation with the shoulders 230, hold the strainer in position upon the sleeve 229. The strainer combination is pressed against the bottom of the ring or reservoir R' by means of the nut 228 threaded upon the nipple 224 at 227, at the same time drawing the shoulder 222 up against the bottom of said reservoir. The bottom plate 232 of the domed strainer 231 will connect in a lubricant-tight fashion to the bottom of the shell 173 by means of the cork gasket 236. This plate is provided with two openings, one to permit entrance of strained lubricant to the inlet passageways 237 and 238 and the other to receive the dowel pin 239. This dowel pin also fits in a socket 240 in the body 221 and serves to fix said pump body in respect to the reservoir.

The lower portion of the bore 225 is enlarged and tapped at 241 to receive a threaded hollow plug 242. The plug is provided with a fillister slot 243 and with a seat 256 for a spring-seated ball check 244 enclosed therein. The combined spring support and ball check retainer 245 is also enclosed within said plug 242 and is provided with openings 246 to permit the ready flow of lubricant into the bore 225 below the plunger 87' during upstroke thereof. The plug 242 has a liquid-tight connection with the bottom of the tapped socket 241 by means of the gasket 247.

The body 221 is also provided with an outlet passage 248 (see Fig. 9) which leads to a tapped socket 249 receiving the hollow threaded plug 250. This plug encloses the spring-seated ball check 251 and the seat therefor 252. The plug 250 cooperates with the gasket 253 to form a lubricant-tight connection. The plug 250 is attached to piping 254 by suitable connection to its tapped outlet socket 255. In this embodiment the plunger on its upstroke will draw in a charge of lubricant past the ball check 244 and on its down stroke will discharge the lubricant past the ball check 251 into the lubricant system.

The movement 165'—165² of the motor head, for example of the magnitude $\frac{5}{16}$ inch, is available, through a suitable reduction, for example of two to one by the bell crank lever 187, for movement of the plunger 87'. The spring 198 is stressed during the downward stroke of the plunger and will push upwardly on the bell crank lever 187, causing the push rod 186 to return with a movement of the motor head away from the reservoir. The stressed spring 203 within the tubular member 180 reacts against the washer 205 and serves to press the right end of the push rod 186 against the ring 204 at all times.

In Figs. 13 to 15 is shown another embodiment in which a horizontal push rod, directly actuated by the sidesway of the top of the motor or engine, has a toggle connection 316 with the top of a vertical connecting rod 192' to reciprocate a plunger attached thereto. In this embodiment the tank and pumping mechanism are substantially the same as shown and described in connection with Figs. 9 to 12 (similarly functioning parts being designated by the same numerals primed). Positioned on top of the reservoir R² and covering the opening 172' is a casting 300, the flange 301 of which is attached to said reservoir by means of the screws 302. Clamped between the flange 301 and the top of the tank is a gasket 176' and a metal plate 177', the central portion 178' of which plate is depressed and provided with an opening to the edges of which is riveted the top of the depending tube 179'.

The casting 300 is provided with a central passageway 303 and with bore 304 of reduced diameter aligned and communicating with one end of said passageway. The other end of said passageway is tapped at 305 to receive the bushing 306. The bushing 306 is provided with the fillister slot 307 and locked in place by the nut 308. The bore 304 and the bushing 306 serve as slide bearings for the push rod 186'. A portion 309 of the push rod 186' between said bearings is enlarged, the stressed spring 311 reacting against the shoulder 310 and serving to force said enlargement toward the engine until it contacts with the inner end of the bushing 306. The end of the rod 186' is provided with a tapped socket 325 which receives the adjustable extension 312. This extension is provided with a flat 313 to enable it to be turned with the use of a suitable tool, a lock nut 314 serving to fix said extension 312 in position. The casting 300 and the enlargement 309 are provided with cooperating domed openings 315 and 318 into which projects a toggle bar 316.

The upper end of the bar 316 bears within a socket 317 at the top of the opening 318. The lower end of the toggle bar 316 fits in a conical depression 319 in the reciprocating element 320 which element bears within the depending tubular member 179'. This element is provided with a socket 321 at its lower side to receive the upper end of the connecting rod 192'. The spring 198' is connected to the rod 192' and to the cylinder 179' substantially in the manner as already described in the case of Fig. 9, and serves to push upwardly upon the element 320 through the rod 192'.

In this embodiment the push rod 186' is shown in its extreme position in its movement toward the engine, the push rod 186' being stopped by bushing 306. One half 165—165' of the total movement 165'—165$^2$ (say of a magnitude of $\frac{5}{32}$ inch) is utilized to move the top of the push bar 316 horizontally between the positions 322 and 322' and the lower end of said bar between the completed charge and discharge positions 323 and 323' respectively, the horizontal movement of the top of the bar being about twice the vertical movement in the embodiment shown. The lubrication of the push rod bearings 306 and 304 is obtained by spray or splash of lubricant through the openings 324 in the plate 177'. The passageways 325 and 326 in the push rod 186' prevent lubricant, which might collect in the end of the bore 304, from interfering with the movement of the push rod.

The embodiments of Figs. 16 and 17 are generally similar in construction and operation to the embodiment of Figs. 13 to 15, similarly functioning parts being designated by the same numerals primed or with a superior 2. In these embodiments, however, the end bearing bores 304' are formed in separate members 327 threaded into the tapped ends 328 of the passageways 303' in the castings 300'. The inner ends 310' of said members 327 serve as retainers for stressed springs 311'. The castings 300' also have downwardly projecting nipples 329 centrally bored at 330 to form guides for the tops of the connecting rods 192$^2$. In the embodiment of Fig. 16, the end 331 of the casting 300' is turned inwardly and contacts with the shoulder 341, limiting engineward movement of the push rod 186$^2$. The enlarged portion of the rod 186$^2$ is provided with the cam surface 332. The upper rounded follower end 342 of the rod 192$^2$ will at all times be pressed against the cam surface by a spring (not shown) similarly connected thereto as described in connection with Figs. 9 and 13. In the position of Fig. 16, corresponding to the normal position of the engine, the connecting rod 192$^2$ and the plunger (not shown) will be about to commence a downward discharge stroke. A sway of the motor body from its normal position 165 to either position 165' or 165$^2$, will result in movement of the center of the cam surface to either position 336' or 336$^2$ respectively, in either case causing a downward discharge stroke of about one-half the magnitude of the actuating engine movement. A return movement of the center of the cam surface to its normal position 336 will cause a reverse upward charging stroke. Thus, the motor in one complete vibration cycle will cause two successive charge and discharge strokes of the pumping mechanism. The return movement of the push rod 186$^2$ is caused by the expansion of the spring 311' stressed during said first movement.

In the case of the cam 333 of Fig. 17, (the push rod 186$^2$ being shown in its extreme position toward the engine head) the piston of the pumping mechanism will be normally maintained in mid-stroke position at 336, a movement 336—336$^2$ of the push rod resulting in a completion of the discharge stroke and a reverse movement 336—336' resulting in a completion of the charge stroke. As shown, the piston is in its uppermost position at the commencement of its downward discharge stroke. One complete cycle of vibration or sway of the motor body will result in only one complete charge and discharge cycle of the pumping mechanism. The top of the connecting rod 342 will limit movement toward the engine head by contacting with the shoulder 339 at end of the cam surface 333, as shown.

In both embodiments of Figs. 16 and 17, the passageways 303' serve as bearings for the push rods 186$^2$ and are lubricated by lubricant splash or spray passing upwardly through the openings 324' and the bores 335. The circumferential grooves 334 on the push rod enlargement assist in the lubricant distribution.

In the embodiment of Figs. 18 to 21, the pumping mechanism is placed below and in communication with the reservoir with the result that at all times the mechanism will be thoroughly lubricated. The plunger 371 is directly actuated by the sidesway or vibration of the motor body without intermediate levers, linkage or cams. The pump body 360 is flanged at 361 and clamped by said flanges to the bottom of the reservoir R$^3$ together with the gasket 362 by the screws 364, the intervening supporting bracket 363 being welded to the reservoir bottom. The body is provided with an upward extension 365 which projects into the reservoir R$^3$ through the opening 366. The upper part of said extension 365 is shouldered at 367 to receive a dome-shaped metallic strainer 368 held in position by means of the ring 369 which may be soldered thereto. The central portion of the body 360 is provided with a longitudinal bore 370 receiving the plunger or piston 371. The right side of the bore 370 is enlarged at 372 to receive the loose washer 375 and the spring 374 reacting thereagainst, and is tapped at 373 to receive the threaded and bored spring-retainer plug 376. Beyond the tapped enlargement 373 there is a further tapped enlargement 377, receiving the threaded annular plug 379. The plug 379 is interiorly provided with a valve seat 380 and encloses the ball check 381, the spring 383 therefor and the spring retainer 382. The outer portion of the plug is provided with a tapped socket 384 enabling suitable connection to a conduit system for supplying the chassis or other lubricant distributing system.

The untapped portion of the enlargement 372 serves as a pump chamber receiving a strained lubricant charge through the central socket 441, the vertical passageway 385 in the body 360, and the radial and axial bores 386 and 387 in the plunger 371. The end of the plunger bore 387 is enlarged to receive and form a seat for the inlet ball check 389. The end of the plunger 371 encircling said ball check 389 is of reduced diameter and indented at several places 390 to retain the same.

The plunger 371 is provided with a lubricant-tight connection with the body 360 by means of a sylphon 391 attached in lubricant-tight fashion between the pump body 360 at 392 and the plate 393. The plate 393 is riveted at 395 against the enlargement 394 on the plunger 371. A prolongation 396 of the plunger 371 is threaded into the tapped portion 397 of a sleeve 398, said sleeve being interiorly reduced and bent inwardly at 399 to form a stop for the shouldered contact member 400. The stressed spring 401 serves to force the shoulder 402 of said member against said stop. The sylphon 391 may be completely or partly filled with lubricant which it receives and discharges through four passageways 403 (see also Fig. 21).

In operation, the end of the plunger 371 at rest positions itself at 404 corresponding to the normal engine body position 165. A movement 165—165' of the engine results in a partial stroke 404—404' of the plunger and a discharge of lubricant past the ball check 381. During the movement the washer 375 is pressed to the right by the plunger 371 compressing the spring 374 and the inlet ball check 389 being forced against its seat by the pressure of lubricant in the chamber 372. Excessive movement of the engine body may be taken up by compression of the spring 401 and relative movement between the sleeve 398 and the contact member 400. During the movement 404—404' of the plunger, the sylphon 391 will be compressed and lubricant will flow therefrom into the passage 395 through the bores 403.

When the engine body moves in the reverse direction 165'—165 or 165'—165² the spring 374, reacting against the washer 375 and therethrough against the end of the plunger 371, will cause the contact member 400 to follow the engine body. This will result in the opening of the inlet valve 389 and supply of a charge of strained lubricant to the chamber 372. The charge will be discharged upon the next return movement. The sylphon 391 will be expanded during this movement and lubricant will flow through the passages 403 to fill any voids therewithin.

In Figs. 22 and 23 is shown another embodiment which operates similarly to the embodiment of Figs. 18 and 21, except that the actuating connections are caused to pass directly through the lower portion of the tank. In this embodiment the cylindrical reservoir R⁴ is laid on its side each cup member 173² and 174² being provided with a casing bracket 171³. The construction of the pump P⁴ is substantially the same as already described in connection with Figs. 9 and 12 with the exception that the pump body is laid on its side with the plunger 87² fitting in a horizontal bore 225' and with the outlet bore 248' at right angles to the pump chamber 229' and extending vertically downwardly. Other corresponding parts are designated by the same numerals primed.

A connecting rod 550 is bored at 551 to receive a shouldered contact piece 552 which is retained in place by the tapped cap 553, the contact piece 552 being forced against said cap by means of the stressed spring 554. The reduced end portion 555 of the piece 552 contacts with the head 556 of the screw 557. The screw passes through the downturned end 569 of the eyelet 56² and is locked into position thereto by means of the nut 558. The eyelet 56² is rigidly fixed to the motor head M by the nut 58² and the bolt 57². The connecting rod 550 passes through an opening 559 in the side of the tank which opening is closed by means of the cap 560 necked at 561 to form a bearing for said connecting rod. The U-bracket 562 is attached to the cap 560 adjacent the base of the neck 561. The inner end of the bracket 562 retains the spring 564 which presses against the collar 565 held in position on the connecting rod 550 by the ring 566. The spring 564 always presses the connecting rod 550 to the right, said connecting rod being stopped by contact between the collar 565 and the neck 561.

Encircling the connecting rod 550 is a sylphon 575, the ends of which are clamped to the plates 576 and 577. The plate 576 is locked against the shoulder 578 of the connecting rod 550 by means of the nut 579, which screws upon the threaded portion 580 of the connecting rod, the washer 581 and the gasket 582 intervening between said shoulder and said end plate 576. The annular plate 577 is clamped to the base of the cup 174² together with the gasket 583 by means of the cap 560 and the bolts 584. The opening 590 establishes communication with the atmosphere, the sylphon in this embodiment being air filled instead of lubricant filled. The opening 585 in the side of the connecting rod 550 also establishes communication between the inside of the sylphon and the bore 551. The cap 553 and the nut 579, after adjustment, may be fixed upon the connecting rod 550 by mutilating the threads thereon through the openings 587 and 586 respectively.

In this embodiment the motor head M will push the plunger 87² during its discharge stroke, and the stressed spring 564 will assure a return charging stroke upon reverse movement of said motor head. Excessive movement of the motor will be taken up by collapsing of the spring 554 and relative movement between the contact piece 552 and the connecting rod 550.

Since in some instances the motor body, after periods of operation, is liable to change its normal quiescent position due to distortions of the chassis members, sagging in the supports or for other reasons, it is desirable to provide some means of adjusting the pump plunger in respect to the motor body, so as to take up the proper normal position. In Figs. 3, 4a and 4b, the clevis 52 is provided with an extension 600. The plate 603 provided with a flange 605 is attached to the extension 600 by the bolt 604. The end of the flexible cable 54 is turned around and clamped by the end of the bolt 604. The flange 605 prevents pivotal movements of the plate 603 about the extension 600, which would tend to loosen the bolt 604. Suitable markings (not shown) may be provided adjacent the top of the lever 50 and upon the upstanding member 49 between the fork stops 48. These markings should coincide when the motor body is in position 165 in which position the lever 50 would be midway between the stops 48, and the plunger 68 would just close the inlet port 114. If the arrangement gets out of adjustment, the bolt 603 may be loosened, the cord 54 adjusted so as to give the desired lever position and the bolt then retightened.

In Fig. 3a the adjustment is somewhat easier since the lever 50' is adapted to contact with the right stop 48 when the engine is in position 165. By loosening the nut 58 the eyelet 56' may be moved upon the bolt 57' so as to cause the lever 50' to contact with stop 48'.

In the embodiments of Figs. 9 to 23, the pistons 87', 87², and 371 are adapted to pump substantially from any position within the pump chambers 220, 220', and 372, regardless of their normal at rest position in the cylinder, and there is no need for exact adjustments as in the case of the ported pump of Figs. 1 to 5. In the embodiments of Figs. 14 to 17, however, the contact member 312 or 312' may be conveniently adjusted by loosening the lock nut 314, inserting a tool through the opening 313 and then suitably screwing or unscrewing the contact member 312 into or out of the socket 311. In Fig. 22 the adjustment is suitably accomplished by loosening the lock nut 558 and turning the screw 556.

In the embodiments of Figs. 16 and 17, the stops 331—341 and 339 might be omitted permitting the spring 311 to cause contact of the member 312 with the engine body M at all times. In the embodiment of Fig. 16 an automatic adjustability might be also provided for substantial changes in the normal engine position, by elongating the enlargement 303' and providing a series of cam surfaces 332 side by side. Similar modification might be made in the embodiments of Figs. 18 to 23 inclusive, by eliminating the stops 402 and 553, and permitting the springs 401 and 554 to press the contact members 400 and 555 against the motor body at all times.

Automatic adjustments might also be provided by inserting friction or roller bearing clutches, ratchet wheels or dashpot arrangements in the actuating connections between the motor body and the pump plunger or piston. These clutches might be so designed as to cause one stroke of the piston for a plurality of reciprocations of the motor body, which would enable the utilization of a larger plunger or piston more satisfactory for many purposes. In this manner the substantial continuous drive by the motor body could be translated into a frequent or infrequent intermittent discharge of the pump of substantial capacity.

The actuating connections may be so arranged that the pump will only be sensitive to vibrations of the engine of relatively large amplitude or the arrangement may be constructed so as to be most sensitive to the small engine vibration as will occur even on the smoothest of roads. In the latter case provision may be made for damping out the engine vibrations of large amplitude as by the provision of suitably placed stops or by other means. As shown, the actuating connections are attached to the top of the motor which has the maximum movement, but if smaller movements are desired, the actuating connections may be attached to a point lower on the engine body.

In the preferred embodiments the pump is shown as actuated by the sidesway or transverse vibration of the motor head of an automobile. Instead of utilizing the motor body other horizontally reciprocating pivoted structures or massive bodies might be employed. It would also be possible to actuate the pumping mechanism from some other vibrating or swaying part of the automotive vehicle or of the mechanism to be lubricated. For example, the pump might be actuated by the longitudinal movement of the engine in respect either to the dashboard or the radiator or the relative movement between the chassis frame and any other part of the vehicle. The weaving of the chassis frame itself might be employed to directly actuate the pumping arrangement. In the embodiments described the pump could be conveniently supported upon the engine and the end of the actuating connections attached to the dashboard. Pumps for other purposes than supplying central chassis lubricating installations or other accessories, might be similarly actuated by the transverse vibration of the engine as disclosed in the present invention.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

I claim:

1. A lubricating installation for a vehicle mechanism provided with a multiplicity of bearings, comprising a branched distributing system, flow metering instrumentalities associated with said conduit system for metering the lubricant to said bearings and a lubricant pressure source with a reciprocating ejecting element actuated by direct connection to a relatively laterally vibrating part of said mechanism, the movement of which is approximately of the same magnitude as the desired movement of the reciprocating element, said lateral vibration taking place horizontally and transverse to the direction of movement of the vehicle.

2. A central lubricating installation for a vehicle mechanism provided with two elements independently supported upon the frame of the mechanism and vibrating relatively in respect to each other, comprising a branched distribution system leading to the bearings to be lubricated, a pump element associated with said system mounted upon one of said elements and actuating connections to the other of said elements motivated by the lateral vibration between said elements to actuate said pump, said lateral vibration taking place horizontally and transverse to the direction of movement of the vehicle.

3. In combination with an automotive vehicle, provided with a chassis and with two elements independently supported upon and extending above said chassis, an accessory and means for driving said accessory actuated by the relative movement between said elements, one of said elements consisting of the dashboard and the other consisting of the engine body.

4. In combination with an automotive vehicle, provided with a chassis and with two elements independently supported upon and extending above said chassis, an accessory and means for driving said accessory actuated by the relative movement between said elements, one of said elements consisting of the dashboard and the other consisting of the engine body, the relatively moving elements being actuated by weaving of the chassis during operation.

5. In combination with an automotive vehicle, provided with a chassis and with two elements independently supported upon and extending above said chassis, an accessory and means for driving said accessory actuated by the relative movement between said elements, one of said elements consisting of the dashboard and the other consisting of the engine body, the relative movement being caused by the lateral vibration of the engine body.

6. A central lubricating installation for an automobile provided with two elements independently supported upon different parts of and extending above its chassis, comprising a branched distribution system leading to the bearings to be lubricated, a pump element associated with said system mounted upon one of said elements and actuating connections to the other of said elements motivated by relative movement between said elements to actuate said pump, one of said elements consisting of the dashboard and the other consisting of the engine body.

7. A central chassis lubricating installation for an automobile provided with two elements relatively moving in respect to each other independently supported at a plurality of widely spaced points upon said chassis, comprising a branched distribution system leading to the chassis bearings, and a pump associated with said system for creating lubricant pressure to be supplied thereto, the ejecting element of said pump moving with one of the relatively moving elements and the cylinder or relatively fixed portion of said pump moving with the other of said relatively moving elements one of said elements consisting of the dashboard and the other consisting of the engine body.

8. In a central chassis lubricating installation, distributing piping having highly restricted calibrated flow control fittings at the outlet branches thereof, a force pump of small capacity at the inlet to the system having a cylinder and a piston and a mechanical transmission converting a weaving motion of the chassis into a high pressure expelling stroke of the pump, said chassis being provided with elements moved relatively by said weaving, said transmission including connections respectively connecting said cylinder and piston to said relatively moving elements.

9. A chassis lubricating apparatus including a lubricant-filled, pressure-tight distributing conduit system, highly restricted flow-controlling outlets at the points of lubricant delivery, a reservoir, a force pump of small volume deriving its charge from the reservoir and feeding it into the distributing system and actuating connections deriving energy from an element caused to vibrate due to weaving of the chassis and including a relatively great mass as the power element, said connections being operatively attached to the expelling element of the force pump whereby minute charges of lubricant are forced into the system at rapidly succeeding intervals to maintain a substantially continuous and relative slow flow from the outlets during operation of the vehicle.

10. A chassis lubricating apparatus including a lubricant-filled, pressure-tight distributing conduit system, highly restricted flow-controlling outlets at the points of lubricant delivery, a reservoir, a force pump of small volume deriving its charge from the reservoir and feeding it into the distributing system, and an element deriving energy from the weaving of the chassis, said connections being operatively attached to the expelling element of the force pump whereby minute charges of lubricant are forced into the system at rapidly succeeding intervals to maintain a substantially continuous and relative slow flow from the outlets during operation of the vehicle, the pump including a small bore tight fitting plunger.

11. A lubricating installation for an automotive vehicle, having a plurality of bearings and provided with a heavy engine body, comprising a branched distribution system for conducting lubricant to said bearings, flow metering devices associated with said conduit system for proportioning the lubricant among said bearings, a source of lubricant pressure and means connected to said engine body and to said source so that the source will be directly actuated by vibration of the engine body.

12. A lubricating installation for an automotive vehicle, having a plurality of bearings and provided with a heavy engine body, comprising a branched distribution system for conducting lubricant to said bearings, flow metering devices associated with said conduit system for proportioning the lubricant among said bearings, a source of lubricant pressure and means connected to said engine body and to said source so that the source will be directly actuated by vibration of the engine body, the automotive vehicle being provided with a chassis and the engine body being flexibly supported upon said chassis.

13. In a chassis lubricating installation for an automobile having a motor supported upon said chassis, a body also supported thereupon and a plurality of chassis bearings to be lubricated; a branched distribution system, flow metering instrumentalities associated with said distribution system for proportioning the lubricant among the bearings, a reciprocating pump mechanism connected with the inlet of said distribution system for applying lubricant pressure thereto and connecting means between the engine body and the reciprocating pump for causing reciprocation thereof upon vibration of the engine.

14. A central lubricating installation for a plurality of bearings associated with an automobile having an engine body supported upon a chassis, said installation comprising a branched distribution system, a reciprocating pump connected with the inlet of said distribution system for applying lubricant pressure thereto and connecting means between the engine body and said reciprocating pump for causing movement thereof upon a transverse vibration of the engine body, said connecting means being of such construction and arrangement that the movement of the engine will pull the ejecting element of the pump during the charging stroke.

15. A central lubricating installation for a plurality of bearings associated with an automobile having an engine body supported upon a chassis, said installation comprising a branched distribution system, a reciprocating pump connected with the inlet of said distribution system for applying lubricant pressure thereto and connecting means between the engine body and said reciprocating pump for causing movement thereof upon a transverse vibration of the engine body, said connecting means being of such construction and arrangement that the movement of the engine will push the ejecting element of the pump during its discharging stroke.

16. A central lubricating installation for a plurality of bearings associated with a mechanism having a laterally reciprocating mass supported thereupon, said installation comprising a branched distribution system, a pump with a reciprocating ejecting element connected to the inlet of said distribution system applying lubricant pressure thereto, connecting means between said mass and said pump for causing mutual reciprocation thereof and resilient means associated with said connecting means, said connecting means and said resilient means being so arranged that the mass through said connecting means will cause a stroke of the ejecting element of said pump simultaneously stressing said resilient means, the return stroke of the pump being caused by the release of said resilient means.

17. A central lubricating installation for a plurality of bearings associated with a mechanism having a laterally reciprocating mass supported thereupon, said installation comprising a branched distribution system, a pump with a reciprocating ejecting element connected to the inlet of said distribution system applying lubricant pressure thereto, connecting means between said mass and said pump for causing mutual reciprocation thereof and resilient means associated with said connecting means, said connecting means and said resilient means being so arranged that the mass through said connecting means will cause a stroke of the ejecting element of said pump simultaneously stressing said resilient means, the return stroke of the pump being caused by the release of said resilient means, the resilient means being a spring stressed by compression during the charging stroke of the pump.

18. A central lubricating installation for a plurality of bearings associated with a mechanism having a laterally reciprocating mass supported thereupon, said installation comprising a branched distribution system, a pump with a reciprocating ejecting element connected to the inlet of said distribution system applying lubricant pressure thereto, connecting means between said mass and said pump for causing mutual reciprocation thereof and resilient means associated with said connecting means, said connecting means and said resilient means being so arranged that the mass through said connecting means will cause a stroke of the ejecting element of said pump simultaneously stressing said resilient means, the return stroke of the pump being caused by the release of said resilient means, the resilient means being spring stressed by compression during the discharging stroke of the pump.

19. A central lubricating installation for a plurality of bearings associated with a mechanism having a reciprocating mass supported thereupon, said installation comprising a branched distribution system, a pump with a reciprocating ejecting element connected to the inlet of said distribution system applying lubricant pressure thereto, connecting means between said mass and said pump for causing mutual reciprocation thereof, said connecting means including a flexible cord and a resilient means in series.

20. A central lubricating installation for a plurality of bearings associated with a mechanism having a reciprocating mass supported thereupon, said installation comprising a branched distribution system, a pump with a reciprocating ejecting element connected to the inlet of said distribution system applying lubricant pressure thereto, connecting means between said mass and said pump for causing mutual reciprocation thereof, said connecting means including a flexible cord and a tightly wound spring in series, the former for taking up excessive approaching movements of the mass and the latter for taking up excessive separating movements of the mass.

21. A central lubricating installation for a plurality of bearings associated with a mechanism having a reciprocating mass supported thereupon, said installation comprising a branched distribution system, a pump with a reciprocating ejecting element connected to the inlet of said distribution system applying lubricant pressure thereto, connecting means between said mass and said pump for causing mutual reciprocation thereof, said connecting means consisting in part of telescoping members, one of which is connected to the mass and the other of which is connected to the ejecting element of said pump, and resilient means between said telescoping members for taking up excessive movements of the mass.

22. A central lubricating installation for a plurality of bearings associated with a mechanism having a reciprocating mass supported thereupon, said installation comprising a branched distribution system, a pump with a reciprocating ejecting element connected to the inlet of said distribution system applying lubricant pressure thereto, connecting means between said mass and said pump for causing mutual reciprocation thereof, said connecting means being provided with stops, and collapsing means to permit excessive movements of said mass without transmission thereof to said ejecting element.

23. A central lubricating installation for a plurality of bearings associated with a mechanism having a reciprocating motor element supported thereupon, said installation comprising a branched distribution system, a reservoir, a pump with a reciprocating ejecting element connected to the inlet of said distribution system applying lubricant pressure thereto, connecting means between said motor element and said pump for causing mutual reciprocation thereof, said connecting means including vertical and horizontal reciprocating elements the far ends of which are connected to the motor element and to the ejecting element of the pump respectively, and means connecting the adjacent ends of said reciprocating elements for converting the horizontal reciprocating movement of one element into a vertical reciprocating movement of the other element.

24. A central lubricating installation for a plurality of bearings associated with a mechanism having a reciprocating motor element supported thereupon, said installation comprising a branched distribution system, a reservoir, a pump with a reciprocating ejecting element connected to the inlet of said distribution system applying lubricant pressure thereto, connecting means between said motor element and said pump for causing mutual reciprocation thereof, said connecting means including vertical and horizontal reciprocating elements, the far ends of which are connected to the motor element and to the ejecting element of the pump respectively, and means connecting the adjacent ends of said reciprocating elements for converting the horizontal reciprocating movement of one element into a vertical reciprocating movement of the other element, the reciprocating pump being associated with and positioned adjacent the bottom of the reservoir and the reservoir supporting said connecting means.

25. A central lubricating installation for a plurality of bearings associated with a mechanism having a reciprocating mass supported thereupon, said installation comprising a branched distribution system, a reservoir, a pump with a reciprocating ejecting element connected to the inlet of said distribution system applying lubricant pressure thereto, connecting means between said mass and said pump for causing mutual reciprocation thereof, said pump being positioned adjacent the bottom of the reservoir and being normally immersed in lubricant therefrom, and said connecting means having an actuating attachment to the pump at a point substantially below the lubricant level, and a sylphon arrangement positioned at said point of attachment to form a lubricant-tight connection.

26. A central lubricating installation for a plurality of bearings associated with a mechanism having a reciprocating mass supported thereupon, said installation comprising a branched distribution system, a reservoir, a pump with a reciprocating ejecting element connected to the inlet of said distribution system applying lubricant pressure thereto, connecting means between said mass and said pump for causing mutual reciprocation thereof, said pump being positioned outside of and being attached to the bottom of the reservoir and including a body with a longitudinal bore, containing said ejecting element, and a sylphon arrangement enclosing the place of insertion of said element into said bore to form a lubricant-tight connection.

27. A lubricating installation for a mechanism provided with longitudinal supporting members connected by a series of cross members, said longitudinal and cross members weaving in respect to each other during operation of the mechanism, said installation comprising a distribution system, a source of lubricant pressure including a pump associated with said system and actuating connections for said source of pressure so arranged as to be motivated by said weaving, said connections respectively connecting cross members moved relatively by said weaving to said piston to move it in said cylinder.

28. A lubricating installation for an automotive vehicle, having a plurality of bearings and provided with a heavy motor body and a dashboard, said installation comprising a branched distribution system for conducting lubricant to said bearings, flow metering devices associated with said system for proportioning lubricant among said bearings, a source of lubricant pressure having a cylinder and a piston associated with said system and an actuating arrangement including separate connections for said cylinder and piston whereby they are motivated by the relative movement of the dashboard and the engine, said cylinder being fixed relatively to the dashboard and said piston being connected to said engine so that it will move relatively to said cylinder.

29. A lubricating installation for an automotive vehicle, having a plurality of bearings and provided with a heavy motor body and a dashboard, said installation comprising a branched distribution system for conducting lubricant to said bearings, flow metering devices associated with said system for proportioning lubricant among said bearings, a source of lubricant pressure having a cylinder and a piston associated with said system and an actuating arrangement including separate connections for said cylinder and piston whereby they are motivated by the relative movement of the dashboard and the engine, said cylinder being fixed relatively to the dashboard and said piston being connected to said engine so that it will move relatively to said cylinder, the actuating arrangement being motivated solely by the relative transverse movement between the engine and the dashboard.

30. A central lubricating installation for a plurality of bearings associated with a mechanism having a reciprocating motor element supported thereupon, said installation comprising a branched distribution system, a reservoir, a pump with a reciprocating ejecting element connected to the inlet of said distribution system applying lubricant pressure thereto, connecting means between said motor element and said pump for causing mutual reciprocation thereof, said connecting means including vertical and horizontal reciprocating elements, the far ends of which are connected to the motor element and to the ejecting element of the pump respectively, and means connecting the adjacent ends of said reciprocating elements for converting the horizontal reciprocating movement of one element into a vertical reciprocating movement of the other element, the top of said reservoir being provided with a longitudinal bearing guide for the horizontal element, which bearing guide is provided with openings communicating with the interior of the reservoir to receive lubricant therefrom.

31. A central lubricating installation for a plurality of bearings associated with a mechanism having a reciprocating motor element supported thereupon, said installation comprising a branched distribution system, a reservoir, a pump with a reciprocating ejecting element connected to the inlet of said distribution system applying lubricant pressure thereto, connecting means between said motor element and said pump for causing mutual reciprocation thereof, said connecting means including vertical and horizontal reciprocating elements, the far ends of which are connected to the motor element and to the ejecting element of the pump respectively, and means connecting the adjacent ends of said reciprocating elements for converting the horizontal reciprocating movement of one element into a vertical reciprocating movement of the other element, the horizontal element being provided with an adjustable extension for purposes of regulating the position of the ejecting element in respect to the motor element.

JOSEPH BIJUR.